US011810194B1

(12) United States Patent
Sacristan et al.

(10) Patent No.: US 11,810,194 B1
(45) Date of Patent: Nov. 7, 2023

(54) REDUCTION OF COMPUTATIONAL RESOURCES OF AN ELECTRONIC TRADING SYSTEM REQUIRED FOR MANAGEMENT OF ELECTRONIC TRADEABLE INSTRUMENTS IMPLEMENTED AS INSTANTIATED DATA OBJECTS

(71) Applicant: Chicago Mercantile Exchange Inc., Chicago, IL (US)

(72) Inventors: Paul Sacristan, New York, NY (US); Dileep C. Konduru, Schaumburg, IL (US); Marla Frank, Chicago, IL (US); Paul Sons, Chicago, IL (US); Eric Schuldt, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 23 days.

(21) Appl. No.: 17/734,643

(22) Filed: May 2, 2022

(51) Int. Cl.
G06Q 40/00 (2023.01)
G06Q 40/04 (2012.01)

(52) U.S. Cl.
CPC .................... *G06Q 40/04* (2013.01)

(58) Field of Classification Search
None
See application file for complete search history.

(56) References Cited

U.S. PATENT DOCUMENTS

| | | | | |
|---|---|---|---|---|
| 5,375,055 A | * | 12/1994 | Togher | G06Q 40/03 705/37 |
| 8,055,572 B2 | * | 11/2011 | Schoen | G06Q 40/03 705/37 |
| 10,430,877 B2 | | 10/2019 | Schoen et al. | |
| 11,100,577 B1 | * | 8/2021 | O'Hagan | G06Q 40/04 |
| 11,176,610 B2 | | 11/2021 | Schoen et al. | |
| 2021/0342944 A1 | | 11/2021 | O'hagan et al. | |
| 2022/0036458 A1 | | 2/2022 | Schoen et al. | |

OTHER PUBLICATIONS

"EBS eFix Matching Service Achieves Record Aily Volume of $25.3 Billion", CME press release, Feb. 2, 2022, https://www.cmegroup.com/media-room/press-releases/2022/2/02/ebs_efix_matchingserviceachievesrecorddailyvolumeof253billion.html, 2 pages.

(Continued)

*Primary Examiner* — Olabode Akintola
(74) *Attorney, Agent, or Firm* — LEMPIA SUMMERFIELD KATZ LLC

(57) ABSTRACT

The disclosed embodiments relate to reduction of computational resources of an electronic trading system required for management of electronic tradeable instruments via instantiation of data objects in a memory including both data inherited from and data linked to a master data object stored in an external data structure or database. The combination of both inherited and referenced attributes may uniquely define each instance to enable the electronic trading system to manage and process transactions for a large number of tradeable instrument variations with minimal computational resources. Thereby, the disclosed embodiments enable the listing en mass and scheduling of a large number of financial instruments for trading to cover, for example, various currency patterns, pricing sources and fixing times.

21 Claims, 4 Drawing Sheets

(56) References Cited

OTHER PUBLICATIONS

"One Year On: EBS eFix Matching Sees Significant Growth", CME Group, May 18, 2015, https://www.profit-loss.com/one-year-on-ebs efix-matching sees significant-growth/, 4 pages.

Nasir Mohammad, "EBS develop FX automated trading system for banks", Atoz Markets, May 3, 2018, https://atozmarkets.com/news/ebs-fx-automated-trading-system/, 4 pages.

Steven Hatzakis, "ICAP Creates New eFix Matching Product from Synergy Between EBS and ICAP Voice-Brokers", Finance Magnates, Sep. 4, 2014, https://www.financemagnates.com/forex/products/icap-creates-new-efix-matching-product-from-synergy-between-ebs-and-icap-voice-brokers/, 4 pages.

\* cited by examiner

REDUCTION OF COMPUTATIONAL RESOURCES OF AN ELECTRONIC TRADING SYSTEM REQUIRED FOR MANAGEMENT OF ELECTRONIC TRADEABLE INSTRUMENTS IMPLEMENTED AS INSTANTIATED DATA OBJECTS

BACKGROUND

With regard to trading of financial instruments, there may be two primary modes of trading used: bilateral and central counterparty. In bilateral trading, the parties to a trade effectively negotiate the parameters of that trade between themselves. In contrast, in a central counterparty based system, the parties submit their orders to trade to an intermediary which, in typical implementations, anonymously matches those orders with suitable counterorders submitted by other parties. For either bilateral or central counterparty, electronic trading systems are available to facilitate the electronic submission of orders to trade, e.g., buy or sell, instruments offered for trading by those systems, the matching of orders with suitable counter orders, clear trades, such as via third party clearing service, e.g., CLS, as well as provide access to information regarding available offers, completed trades and other "market" information. In addition, both bilateral and central-counterparty based electronic trading systems may provide risk management, clearing and settlement services to facilitate the completion of trades and the fulfillment of the obligations of the traders per the terms of their agreements.

As used herein, an order, order to trade or trade order refers to a willingness/desire of a trader to enter into a trade/transaction, and more particularly, to an electronic request or data message transmitted to, or received by, an electronic trading system which includes data indicative thereof, such as identity of a product, desired quantity, desired price, side (buy/sell), etc. As used herein, the term trade, executed trade, completed trade, etc., may refer to an agreement between two parties, each to fulfill an obligation defined by the transaction, and may further refer to a given order and the one or more suitable counter orders with which the given order has been matched and/or further cleared and/or settled. Orders may typically be canceled or modified by the submitting trader prior to them being matched with a suitable counter order. Once executed, the trader typically must fulfill their obligation unless they transfer, e.g., sell, or offset, such as be entering into an opposing trade, that obligation to another trader prior to the date on which fulfillment of their obligation is required.

A forward contract, such as a currency forward contract, referred to as an FX forward, is an example of a contract which is traded via a bilateral trading system and calls for delivery of an asset at a later date for a price determined at the inception of the contract. In contrast, a spot contract, e.g., a spot FX contract, calls for substantially immediate, e.g., within 2 days, delivery. For currencies, an FX forward contract is a bilateral contract for delivery, actual or cash settled depending on the contract terms, of an amount of a particular currency, e.g., Euros, at a future date at a price, delineated in a different currency, e.g., dollars, determined at the inception of the contract. Unlike a futures contract, discussed below, a forward contract is traded "over the counter," bilateral, e.g., negotiated directly between the parties as discussed above, and may or may not be standardized as to its terms. Option contracts on a forward contract are also available offering the buyer thereof the right, but not the obligation, to sell or buy the underlying forward contract at a specified price on or before a certain expiration date. Forward contracts may be physically settled, e.g., via the delivery of the amount of the particular currency called for in the contract, or cash settled via delivery of the cash difference, denominated in currency of the contract price, between the contract price and the spot price of the currency to be delivered, which may be the differential in exchange rates between when the contract was entered into and the delivery date. Options contracts for the delivery of a specific currency may also be offered bilaterally and call for delivery of the requisite currency, as opposed to a forward contract therefore. Options contracts traded via a bilateral/OTC trading system may be referred to as OTC options or OTC options contracts.

As will be described, FX spot, FX forward, as well as FX futures contracts, as described below, may relate to transactions for currency pairs. A currency pair comprises the national currencies from two countries coupled for trading on the foreign exchange (FX) marketplace. Both currencies will have exchange rates on which the trade will have its position basis. The calculation for the rates between foreign currency pairs is a factor of the base currency. A typical currency pair listing may appear as, EUR/USD 1.3045. In this example, the euro (EUR) is the base currency, and the U.S. dollar (USD) is the quote currency. The difference between the two currencies is a ratio price. In the example, one euro will trade for 1.3045 U.S. dollars. In other words, the base currency is multiplied to yield an equivalent value or purchasing power of the foreign currency. The phrase "quote currency", which may also be referred to as the "term currency," means, with respect to any currency pair, the second currency of such currency pair and is the currency that is being bought or sold to another party. The phrase "base currency" refers to the first currency in the Currency Pair against which the Client buys or sells the Quote Currency. The base currency typically refers to one, meaning one single currency against a number of quote currencies. This comparison answers the question of how many quote currencies equals in value one base currency. When one is long-biased, one always buy the base currency and sell the quoted. The opposite is also true.

In contrast to bilateral trading systems, central counter party-based trading utilizes an intermediary entity/system to separate the transacting parties such that, within the system, they are prevented from transacting/negotiating directly with one another, or, in most cases, even knowing the identify of their counterparty. For example, a central counterparty based electronic trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity or other underlier, such as a currency, at a specified price at a predetermined future time. An option contract is the right, but not the obligation, to sell or buy the underlying instrument (in this case, a futures contract) at a specified price, referred to as the strike price, on or before a certain expiration date. An option contract on a futures contract, e.g., having a futures contract as an underlier, offers an opportunity to take advantage of futures price moves without actually having a futures position and is considered "in the money" when the strike price is favorable to the market price of the underlier. The commodity, instrument or asset to be delivered in fulfillment of the contract, or alternatively the commodity, instrument or asset for which the cash market price shall determine the final settlement price of the futures contract, is known as the contract's underlying reference or "underlier." The underlying or underlier for an options contract on a futures contract is the corresponding futures contract that is purchased or sold upon the exercise of the option. Options contracts traded via a central counterparty-based trading system may be referred to as Exchange Traded Derivative (ETD) options or ETD options contracts.

Typically, as opposed to typical bilateral contracts, e.g., forward contracts, the terms and conditions of each futures contract are standardized as to the specification of the contract's underlying reference commodity, the composition of the commodity, quantity, delivery date, and means of contract settlement. Such standardization may improve the liquidity of these contracts, e.g., the ease with which such contracts may be bought or sold. Options on futures may be similarly standardized as to, for example, quantity, strike price and expiration/maturity. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement, when the contract expires, by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts, and other derivatives. At expiry, an option on futures, if in the money (ITM), described in more detail below, provides a cash settled payment plus the underlying futures contract, and if out of the money (OTM), it provides nothing. As will be discussed, an underlier of a futures contract may be a currency, e.g., the contract may be for delivery on a specified date of a quantity of Euros in exchange for a defined payment in U.S. dollars.

Aside from the above differences, bilateral and central-counterparty based trading systems differ in terms of who bears responsibility for counterparty risk, i.e., the risk of financial loss to one party to a trade due to the actions, inactions, or consequences thereof, such as the failure to perform on their obligations specified in the transaction, of the counterparty thereto.

In bilateral trading, each party is, generally, directly responsible for the risk of loss in any given trade if their counterparty fails to perform. As such, bilateral trading parties typically require credit verification or other guarantees, or risk mitigations, such as collateral, from their counterparties and often, as will be described, set limits on the amount of risk/exposure they are willing to undertake with a given counterparty. Such limits, which may be referred to as "hard limits," preempt transactions to prevent a limit overrun and may be applied to whether or not an order trade is accepted and/or whether or not it is executed, and/or to filter or mediate the distribution of data related thereto. In contrast, a soft limit may be applied after trade execution and therefore, more loosely enforced. Accordingly, bilateral electronic trading systems, as will be described, typically provide risk mitigations systems in the form of credit limit mechanisms, referred to as credit controls, which allow parties, for example, to define credit limits with respect to their potential counterparties which restrict the extent/magnitude of risk exposure and have the electronic trading system monitor, manage and enforce those limits on their behalf, as well as assist the parties in understanding and managing any credit limits to which they are subject. As any given party may enter into transactions with a myriad of counterparties, the number of different credit limits which a bilateral electronic trading system may have to maintain, manage and enforce may be substantial, as is the volume of transactions against which such limits must be assessed and accounted for.

In contrast, a central counterparty-based exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate counterparty credit risk on behalf of the transacting parties as well as the exchange. Clearing is the procedure through which the clearing house becomes buyer to each seller of a futures contract, and seller to each buyer, also referred to as a novation, and reduces risk of financial loss to each transacting party due to breach of contract by assuring performance on each contract. A clearing member is a firm qualified to clear trades through the clearing house.

An exchange computer system which operates under a central counterparty model acts, e.g., using the clearing mechanism described above, as an intermediary between market participants for the transaction of financial instruments and assumes the counterparty risk to each. In particular, the exchange computer system interposes itself into the transactions between the market participants, i.e., splits a given transaction between the parties into two separate transactions where the exchange computer system substitutes itself as the counterparty to each of the parties for that part of the transaction. In this way, the exchange computer system acts as a guarantor and central counterparty and there is no need for the market participants to disclose their identities to each other, or subject themselves to credit or other investigations by a potential counterparty. For example, the exchange computer system insulates one market participant from the default by another market participant. Market participants need only meet the requirements of the exchange computer system. Anonymity among the market participants further encourages a more liquid market environment as there are lower barriers to participation. The exchange computer system can accordingly offer benefits such as centralized and anonymous matching and clearing.

Accordingly, in central counterparty based systems there may be no need for one party to be concerned about the credit worthiness of another party and so such credit verifications or counterparty credit limits may be avoided. However, the electronic trading system may, itself, impose credit verifications and limits and other risk mitigations. For example, a central counterparty based system may require traders to post a performance bond, or margin, in an amount set to cover the potential risk of loss of a trader's current positions. This performance bond may be adjusted on a periodic, e.g., daily, basis to account for the trading activities of the trader and the then current market value of their positions. In addition, where market participants transact in the trading system on behalf of other parties who may be financially responsible for the activities of those traders, the electronic trading system may permit the responsible party to specify limits, as will be discussed below, on the number or magnitude of open orders or completed trades, such as a margin limit.

While a central counter party-based trading system may offer certain advantages, such as anonymity and risk management, bilateral trading may still often be utilized in situations where the parties prefer not to use a central counterparty, e.g. due to cost, efficiency or other concerns, where the parties wish to complete a transaction as quickly as possible, and/or for non-standard transactions or unique transactions where the transaction terms are not standardized and/or the number of potential suitable and/or interested counter parties may be limited. For example, currency exchange transactions, such as transactions in non-deliverable currencies, foreign exchange forward or swap agreements, are typically entered into as bilateral transactions.

An example of a central counterparty based electronic trading system is the Chicago Mercantile Exchange Inc. (CME) futures exchange, referred to herein also as an "Exchange", which provides a contract market where financial products/instruments, for example futures and options on futures, are electronically traded. An example of a bilateral electronic trading system is the EBS Direct Platform and EBS eFix Matching service provided by CME Group, Inc., which is a wholesale electronic trading platform used to trade on the foreign exchange market (FX) with market-making banks.

The CME futures exchange may be referred to as an Order Driven Market (ODM) in which traders submit, with some limitations, arbitrary orders to buy or sell which are matched with previously received suitable counterorders, stored in an order book database, also referred to as a central limit order book (CLOB), or, otherwise, advertised to the market participants in order to attempt solicit a suitable counter order. In contrast, the EBS Direct Platform may referred to as a Quote Drive Market (QDM), also referred to as a price driven market, which limits trading to binding quotes provided by designated participants, e.g., market makers or dealers, etc. Whereas an ODM may be more transparent, providing visibility, e.g., via an order book database, to all individual market orders to trade, a QDM provides liquidity by guaranteeing quoted prices. That is, in an ODM, a trader may place an order to buy or sell at a desired price but there is no guarantee that another trader will place a suitable counter order thereto to be matched by the ODM's electronic matching engines and traded. In a QDM, orders placed in the QDM's electronic quote matching systems against a submitted quote are essentially guaranteed to be fulfilled but quotes available at different prices may be limited. Other types of markets, including hybrid ODM-QDM markets, may also exist.

Electronic financial instrument trading systems generally allow traders to submit electronic orders to trade many different available financial instruments. The available instruments may vary based on the asset or underlier of the instrument, the particulars of how the instrument is bought and/or sold and/or the particulars of how the purchases or sales of the instrument are settled.

For example, different futures contracts for trading obligations to deliver or receive different underliers at a future date, e.g., oil, gold, S&P 500 shares, Euros, etc. may be made available for different future settlement dates, e.g., for each of the next 3 months from the current date, for different minimum quantities, e.g., mini contracts, etc.

Furthermore, spot contracts for substantially immediate delivery or receipt of different assets, such as different foreign currencies may be offered. A foreign exchange spot transaction, also known as FX spot or spot FX, is an agreement between two parties to buy one currency against selling another currency at an agreed price for settlement on the spot date, typically within 1 or 2 days of the transaction. The exchange rate at which the transaction is done is called the spot exchange rate. A spot FX contract typically stipulates that the delivery of the underlying currencies occur promptly (usually 2 days) following the settlement date. In addition, different types of Spot FX contracts may be offered to satisfy the particular needs of traders.

For example, banks which need to buy or sell foreign currencies, i.e., in exchange for a different currency, often desire to minimize the risk of such transactions, e.g., the risk of variation in exchange rates offered by different currency sources, or the risk of an unexpected change in the exchange rate. This risk may be referred to as "benchmark fixing risk." Accordingly, an electronic trading system may offer a particular type of Spot FX contract referred to as a "fixing" type and orders placed for these instruments may be referred to as "fixing orders". This type of contract is offered for purchase or sale of quantities of particular currencies, defined as a currency pair specifying which currencies are being exchanged. Generally fixing orders specify the side (buy or sell), the currency pair and the quantity but do not specify a price. Instead, such orders are matched with suitable counter orders and then settled at a defined specific "fixing" time at a price, referred to as a "fixing" price, determined at that time from a "fixing" source, e.g., a financial institution which determines and publishes currency exchange rates. Different fixing instruments may be offered with different fixing times throughout a given trading day. An example electronic trading system which offers fixing instruments for spot FX is the EBS eFix Matching Service offered by CME Group Inc. Given the number of fixing sources, the number of currency pairs that are routinely traded and the number of fixing times offered throughout a trading session, more than 2500 different fixing instruments may be made available, at the same or different times, by the electronic financial instrument trading system.

Within the computer systems which implement an electronic financial instrument trading system, the different instruments that are made available for trading are represented by electronic data stored, managed, manipulated, communicated, etc., by those computer systems, to implement the trading functionality of receiving, matching and settling orders, etc. for those instruments. As more instruments are offered, more data is required to be stored, managed, manipulated, communicated, etc. which consumes more of the computational resources of the electronic trading system. For some types of instruments, such as the fixing instruments described above, each different currency pair and fixing time defines a different instrument for which data must be maintained by the electronic financial instrument trading system in order to enable electronic trading thereof. The large number of possible variations results in a correspondingly large number of instruments for which the system must make sufficient computational resources available.

Accordingly, there is a need to reduce the burden on the computational resources of the electronic financial instrument trading system without reducing the flexibility of the system in offering a variety of financial instruments for trading to meet the needs of the traders which trade thereon.

DETAILED DESCRIPTION

Figure 1:
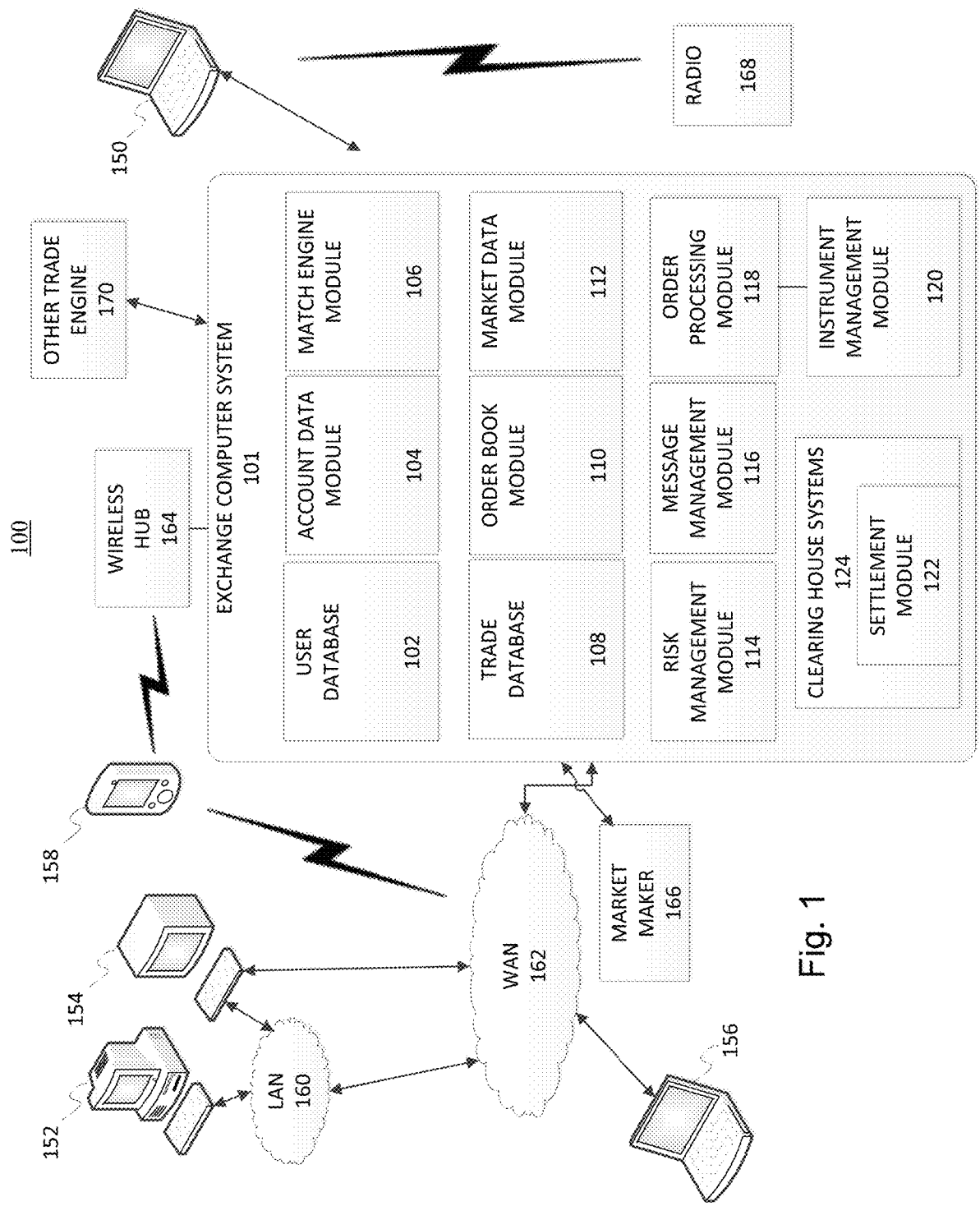
FIG. 1 depicts an illustrative computer implemented execution venue of an electronic trading system that may be used to implement aspects of the disclosed embodiments.

The disclosed embodiments relate to reduction of computational resources of an electronic trading system required for management of electronic tradeable instruments via instantiation of data objects in a memory including both data inherited from and data linked to a master data object stored in an external data structure or database. The combination of both inherited and referenced attributes may uniquely define each instance to enable the electronic trading system to manage and process transactions for a large number of tradeable instrument variations with minimal computational resources. Thereby, the disclosed embodiments enable the listing en mass and scheduling of a large number of financial instruments for trading to cover, for example, various currency patterns, pricing sources and fixing times.

While the disclosed embodiments will be described with respect to fixing instruments for FX spot transactions, it will be appreciated that the disclosed embodiments may be used with any instrument type offered for trading by an electronic trading system, including futures and options contracts, other types of spot contracts, equities, etc.

While the disclosed embodiments may be described with respect to making tradeable instruments available at single match engine or execution venue, it will be appreciated that the disclosed embodiments may be deployed for use with multiple match engines and/or across multiple match engines, which may be located logically and/or physically close or remote from the disclosed system. For example, the disclosed embodiments may be used to support the deployment of a same or different set or subset of tradeable instruments at multiple local and/or remote execution venues and/or match engines. In one implementation, match engines may be located in New Jersey (serving the New York region) and Slough, Uk (serving the London region).

In one embodiment, implemented in conjunction with an electronic trading system which implements electronic trading of fixing type FX spot instruments, such as the EBS eFix platform provided by CME Group, Inc., a plurality of master data objects, referred to as Product Masters, are stored in a database or other data structure which is external to the match(ing) engine of the electronic trading system, and therefore, for example, not consuming the limiting resources of the matching engine memory.

Each Product Master may include data, referred to as Market Control Attributes (MCA's), which define a particular group/subset of products, i.e., tradeable instruments, offered for electronic trading based on the Product Master. This data may include data indicative of the particular currency pair, such as EUR/USD, EUR/CHF, USD/CAD, etc., data indicative of the Fixing Source, i.e., the financial institution or data vendor, such as BFIX or WM Reuters, from which pricing data is obtained for the particular currency pair at the designated fixing time, as well as data indicative of the region or locale for which the pricing data is provided. In one embodiment, there are 10 Fixing Sources providing pricing data for 6 different locales, each providing data for one or more currency pairs, yielding 118 distinct master data objects (Product Masters). In one embodiment, the master data objects are stored in the database arranged by Fixing Source to, for example, make management of the common parameters thereof easier. In one embodiment, the Market Control Attributes of each Product Master further include data indicative of trader permissions which define which traders are allowed to submit trade orders for any tradeable instruments based thereon. It will be appreciated that the Market Control Attributes may include other parameters intended to be global to all related tradeable instruments as will be described, and such parameters may be implementation dependent.

The EBS eFix Matching Service allows banks to net client fixing risk ahead of calculations for the WM/Reuters 4 pm fix and a wide range of other FX industry benchmarks, such as Bloomberg's BFIX and The Moscow Exchange's MOEX RUB Fix. The service was launched in 2014 as a global central utility to execute benchmark risk in an electronic and transparent fashion in direct response to the Financial Stability Board recommendations. Generally, the eFix Matching Service acts as a central market utility to reduce benchmark fixing risk. The service delivers improved global matching opportunities for the most frequently used daily benchmarks and fulfills a need for increased transparency and full auditability around fix order execution. As noted elsewhere, eFix Matching is a form of trading which allows Participants to submit Fixing Orders, which may only match with other Fixing Orders. Fixing Order An Order made by a Participant through the eFix Matching functionality, the price of which is determined by the Fixing Price which is the price of a Fixing Order, determined by an automated set market mid-price from the Operator or a third party market data feed.

The FX fixing price/rate is the precise currency rate at a very specific time of day. The currency and time are agreed upon between price maker and taker prior to a trade. While the trade occurs immediately at the time of the match, once that later agreed time hits, the price is assigned, i.e., the trade is executed wherever the currency pair is trading. The general benefit of trading with an FX fixing rate is complete price transparency as well as neutrality against end of day valuation. As mentioned later, the fixing rates are used for valuation and by executing a trade at the fixing rate, the trader knows their position will be marked flat for the day. If one instead traded a "normal" trade at a specific price, they may have to value their position at a loss (or gain) against the benchmark fixing price at end of day. The Fixing Price will be distributed as soon as practicable after the Fixing Time.

The Fixing Time is the time when trading in a given instrument is closed and the relevant fix or benchmark underlying a Fixing Order is set for (for the avoidance of doubt, this is the exact time referred to in the fix/benchmark (e.g. 4 pm) as opposed to the calculation window over which the Fixing Price is determined (e.g. 3:57:30 pm-4:02:30 pm)). Fixing Orders Match on time priority. They can Match immediately to any opposite interest (including a partial Match); however, the Fixing Price and Counterparty will not be known until the Fixing Price is determined and distributed.

One exemplary Fixing Source is the WM/Reuters Benchmark rates are spot and forward exchange rates used as standard rates for portfolio valuation and performance measurement. WM/Reuters FX benchmark rates are spot and forward foreign exchange rates that are used as standard rates for portfolio valuation and performance measurement.

The WM/Reuters Closing Spot Rate service was introduced in 1994 to provide standard forex rates that would enable portfolio valuations to be compared more accurately against each other and financial benchmarks, without having to account for currency differentials.

The WM/Reuters FX benchmark rates are provided by Thomson Reuters, which acquired the rate calculation business of the World Markets Company (WM) from State Street in 2016. The original WM/Reuters service provided closing spot rates for 40 currencies daily. The service has since expanded to 155 closing spot currencies covered on an hourly basis. In addition, WM/Reuters also provides closing rates for currency forwards and non-deliverable forwards (NDF) hourly intraday for spot, forward and NDF rates, as well as historical data. While most major equity and bond index compilers use the WM/Reuters benchmark rates in their calculations, the rates are also used for other purposes such as calculating benchmark rates for the settlement of financial derivatives. Some banks also provide a service to their clients by providing a guarantee to trade at the WM/Reuters rates. The WM/Reuters benchmark rates are determined over a five-minute fix period, from 2 minutes 30 seconds before to 2 minutes 30 seconds after the time of the fix, which is generally 4 p.m. in London. During this five-minute window, bid and offer rates from the order matching system and actual trades executed are captured. Since trades occur in milliseconds, only a sample is captured, rather than every trade. The median bid and offer are calculated using valid rates over the fix period, and the mid-rate is then calculated from them. The importance of these rates lies in the fact that they are used to value trillions of dollars in investments held by money managers and pension funds. In 2013, the method of fixing the WM/Benchmark rates came under intense scrutiny, after widespread allegations of collusion and rate manipulation by traders surfaced.

In one embodiment, there may be multiple Fixing Sources, each proving pricing data for currency pairs of a particular region or locale. More than one Fixing Source may provide pricing data for the same region or locale and one Fixing Source may provide pricing data for more than one region or locale. Each Fixing Source may provide pricing data for one or more different currency pairs at one or more fixing times. Where each tradeable instrument is defined by at least a Fixing Source, locale, currency pair and fixing time, the number of tradeable instruments made available for trading can easily exceed 2500 or more. In one embodiment, the combination of all of these parameters results in 2621 unique tradeable instruments.

In order to make a particular instrument, i.e., a specific variation of a Product Master (master data object) available for trading, the disclosed embodiments instantiate an instance of the master data object in the memory of the matching engine. Accordingly, for each tradeable instrument, there will be an instance of the master data object instantiated in the memory of the matching engine. Rather than inherit the attributes of the master data object from which the instance was instantiated, each instance, instead, includes a link to those attributes. In addition, each instance further includes instance, i.e., tradeable instrument, specific data/attributes, such as the fixing or closing time and/or other scheduling related data, where the combination of the inherited-by-reference parameters and the instance specific data/attributes, uniquely define the instance among all of the other instances. Scheduling generally means to determine when a market for an instrument is open and when it closes—coupled with automated messaging to inform market participants of the event. In one embodiment, each instance is further associated with an order book data structure which stores data at least indicative of orders for the associated tradeable instrument which have been received but not yet matched with a suitable counter order or otherwise canceled.

Accordingly, the disclosed embodiments provide for instrument management through instantiation of interrelated instances (tradeable instruments for different fixing times) of data objects (master product definition with selectively copied (absolute) data and flow through inheritance (incorporation/inheritance by reference to object). As such, the stored instances may represent compressed data structures via reduction (through incorporation by reference) of redundant data needed to represent multiple financial instruments with overlapping/common characteristics, e.g., fixing source, fixing locale, and fixing time.

As opposed to providing a single instrument for each currency pair, where each fixing time is as an order type, in the disclosed embodiments, each fixing time will be a separate instrument ("new instrument model"). Among other benefits, the disclosed embodiments enable a low cost time to market and are easily maintained and enhanced. For example, the disclosed embodiments can be modified to allow for fixing price plus/minus tick points.

As will be appreciated, the disclosed system enables creation of primary instrument templates to generate the required number of fixing instruments based on the common attributes for the relevant FX currency pairs from the fixing vendor, significantly flattening the data hierarchy. This allows for enhanced performance via responsible structures for low latency trading systems, better adherence to business requirements, improved operational management (market state scheduling, configuration enrichment through market control attributes (MCA), emergency management), and improved the technical workflow by simplifying our reference data, operational tools and trading system applications.

More particularly, as each instance of a tradeable instrument inherits the attributes of the master data object by reference, and this linkage consumes less data, rather than directly inheriting those parameters, the data size of each instance, and therefore the computational resources required to store and manage all of the instances by the matching engine, is necessarily reduced. That is, the matching engine need only store and manage the instrument unique attributes.

In addition, management of the instances is improved as any changes to the common, i.e., MCA, data inherited from the master data objects, need only be made to those master data objects and such changes will automatically flow to each instance thereof, reducing the amount of data which must be updated and reducing the burden on the computational resources of the matching engine to do so. For example, if a Fixing Source wants to make a change to a group of instruments, such changes can be made and the Product Master (master data object) and those changes will automatically propagate to all instances thereof.

Furthermore, the instances may be dynamically managed and/or manipulated by the matching engine independent of how the master data objects are managed and/or manipulated. For example, whereas the master data objects may be organized in the database in an arrangement in accordance with fixing source, such an arrangement may not be efficient for use by the matching engine which needs to enable/open and disable/close electronic trading for each instrument on the appropriate scheduled basis as defined by the particular scheduling data of each instance. Accordingly, it may be more efficient for the instances to be arranged/stored in accordance with their scheduling data, e.g., such that instruments which are opened for trading are stored together and overall, instruments are stored in a time-based ordering of when they are to be opened and closed. When transitioning instruments from open to close and reopen, there is less data to manipulate. Computational Resource saving is the realized via the effort required to group and manage instruments/instances in two ways: natural way/grouping by certain market characteristics like tick, underlying instrument, other operational parameters for managing groups of product masters; for scheduling, due to large number of schedules which cut across the natural groups, instruments are formed into different manageability groups for scheduling (all the things that behave the same from a scheduling perspective are grouped together). Common parameters can be managed independent of schedules.

While, in one embodiment, instances of tradeable instruments are instantiated once and then recurringly/continuously opened for a defined period of time before being closed for fixing, efficiencies in that initial instantiation process are still also realized by being able to readily define which master data object an instrument is to be based on and what specific the specific parameters of the instance will be defined.

The disclosed embodiments provide for a forward-looking solution to achieve a single source view of all product attributes in one system while also maintaining responsibly sized data structures on the matching engine. Attributes that are the same for a large group of products do not need to be defined and transmitted across all systems at the individual instrument level. Accordingly, a solution was needed that allowed a unique set of attributes to be linked to many contracts that share the same configuration.

The disclosed technology addresses the need in the art for improving the efficiency of managing the utilization of computational resources in electronic trading systems which represent and manage electronic tradeable instruments as data objects instantiated in a memory of a matching engine. Specifically, the disclosed technology solves a problem that uniquely arises in the fields of computer technology and exchange computing systems, where it is desirable to be able to reduce the computational resources of an electronic trading system required for management of electronic tradeable instruments via instantiation of data objects in a memory including both data inherited from and data linked to a master data object stored in an external data structure or database. The combination of both inherited and referenced attributes may uniquely define each instance to enable the electronic trading system to manage and process transactions for a large number of tradeable instrument variations with minimal computational resources. Thus, the disclosed solution is rooted in computer technology in order to overcome a problem specifically arising in the computer systems used by electronic trading and other systems which facilitate the electronic trading of financial instruments. Indeed, the subject technology further improves the functioning of the computer by allowing it to use fewer resources.

The disclosed embodiments are drawn to systems and methods that include specific computing components; each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed embodiments may be implemented in a data transaction processing system that processes data items or objects, such as an exchange computing system as described in more detail below. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing and report this information to data recipient computing systems via outbound messages published via one or more data feeds.

FIG. 1 depicts an example of an execution venue 100 of an electronic trading system, which may be used with the disclosed embodiments, e.g., as one of one or more, e.g., geographically dispersed, execution venues of the electronic trading system. The execution venue 100 may include a trading network environment for implementing trading systems and methods as described herein. It will be appreciated that an execution venue 100 may include both the trading network environment and one or more exchange computer systems 101 or include just the one or more exchange computer systems 101 and ancillary components which are coupled with the trading network environment. In this case, an exchange computer system 101 receives orders and transmits market data related to orders and trades to users, such as via wide area network 162 and/or local area network 160 and computer devices 150-156, 166, as will be described below, coupled with the exchange computer system 101. The depicted execution venue 100 may be an example of an ODM. Other execution venues may implement a QDM or both an ODM or ODM, or hybrid thereof or alternative thereto. The depicted venue 100 may implement fixing order types as described herein. As was described above, the depicted execution venue 100 may be located geographically and/or logically in a particular location, such as a location that is geographically and/or logically proximate to the computer device 150-156, 166 which, as described, may be used to submit electronic trade orders to the execution venue 100. It will be appreciated that computer device 150-156, 166 may also be coupled with other execution venues, such as via the networks 160, 162 so as to be able to submit electronic trade orders thereto as well.

Herein, the phrase "coupled with" is defined to mean directly connected to or indirectly connected through one or more intermediate components. Such intermediate components may include both hardware and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herein unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 101 may be implemented with one or more mainframe, desktop or other computers, such as the computer 200 described below with respect to FIG. 2. A user database 102 may be provided which includes information identifying traders and other users of exchange computer system 100, such as account numbers or identifiers, user names and passwords. An account data module 104 may be provided, which may process account information that may be used during trades and/or credit control, as described below. One or more match(ing) engines or match engine modules 106 may be included to match bid and offer prices and may be implemented with software that executes algorithms for matching bids and offers, in conjunction with controlling credit, as will be described in more detail below in connection with FIGS. 3 and 4. Each match engine module 106 may handle transactions for different product or group of products traded on the Exchange. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 114 may be included to compute and determine a user's risk utilization in relation to the user's defined risk thresholds. In some cases, the risk management module 114 may be used to implement the credit control processing described herein, as will be addressed in connection with the example of FIG. 3. An order processing module 118 may be included to decompose delta based and bulk order types for processing by the order book module 110 and/or match engine module(s) 106. A volume control module may be included to, among other things, control the rate of acceptance of mass quote messages in accordance with one or more aspects of the disclosed embodiments.

As described herein, an instrument management module 120, described in more detail below, may be provided and coupled with, for example, at least the match engine module 106. The instrument management module 120 may be used, as described herein, to design, define, manage and introduce financial instruments for trading in the electronic trading system, e.g., into the matching engine 106. As will be described, the instrument management module 120 may include a user interface (not shown) to enable interaction by a user and an instrument database (not shown) which stores the Product Masters/master data objects as described.

It will be appreciated that concurrent processing limits may be defined by or imposed separately or in combination, as was described above, on one or more of the trading system components, including the user database 102, the account data module 104, the match engine module(s) 106, the trade database 108, the order book module 110, the market data module 112, the risk management module 114, the order processing module 118, or other component of the exchange computer system 101. Any number of the above-described trading system components may be used or otherwise involved in implementation of the credit control of the disclosed methods and systems.

The trading network environment of the execution venue 100 or in which the execution venue 100 is implemented is shown in FIG. 1 and includes example computer devices 150-156, 166 that depict different example methods or media by which a computer device may be coupled with the exchange computer system 101 or by which a user/trader may communicate, e.g. send and receive, trade or other information therewith. It will be appreciated that the types of computer devices deployed by traders and the methods and media by which they communicate with the exchange computer system 101 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 101. Depending on the type of computer device, a user can interact with the computer with a keyboard, pointing device, microphone, pen device or other input device now available or later developed.

An example computer device 150 is shown directly connected to exchange computer system 101, such as via a T1 line, a common local area network (LAN) or other wired and/or wireless medium for connecting computer devices, such as the network 220 shown in FIG. 2 and described below with respect thereto. The example computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the example computer device 150 or a user thereof. The user of the example computer device 150, or the example computer device 150 alone and/or autonomously, may then transmit the trade or other information to the exchange computer system 101.

Example computer devices 152 and 154 are coupled with the local area network ("LAN") 160, which may be configured in one or more of the well-known LAN topologies, e.g. star, daisy chain, etc., and may use a variety of different protocols, such as Ethernet, TCP/IP, etc. The example computer devices 152 and 154 may communicate with each other and with other computer and other devices, which are coupled with the LAN 160. Computer and other devices may be coupled with the LAN 160 via twisted pair wires, coaxial cable, fiber optics or other wired or wireless media. As shown in FIG. 1, an example wireless personal digital assistant device ("PDA") 158, such as a mobile telephone, tablet-based computer device, or other wireless device, may communicate with the LAN 160 and/or the Internet 162 via radio waves, such as via WiFi, Bluetooth and/or a cellular telephone-based data communications protocol. The PDA 158 may also communicate with exchange computer system 101 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Example computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described below with respect thereto.

As was described above, the users of the exchange computer system 101 may include one or more market makers that may maintain a market by providing constant bid and offer prices for a derivative, security, or other financial product to the exchange computer system 101, such as via one of the example computer devices depicted. The exchange computer system 101 may also exchange information with other trade engines, such as trade engine 170.

In the example of FIG. 1, the execution venue 100 may be coupled with other execution venues (not shown) which may support trading activities in venues geographically remote from the exchange computer system 100, e.g., located in Tokyo and London, and coupled therewith via the Internet 162 and/or other non-proprietary or proprietary distributed network. One or more components of the exchange computer system 101 may be replicated in the other execution venues.

The trading environment of the execution venue 100 may include any number of additional match engines and other computers and systems coupled to the exchange computer system 101. Such computers and systems may include clearing, regulatory and fee systems.

The operations of computer devices and systems shown in FIG. 1 may be controlled by computer-executable instructions stored on a computer-readable storage medium (as opposed to computer-readable communication media involving propagating signals) or a non-transitory computer-readable storage medium. For example, the example one or more of the computer devices 150-156, 166 may include computer-executable instructions for receiving order information from a user and transmitting that order information to exchange computer system 101. In another example, the example one or more of the computer devices 150-156, 166 may include computer-executable instructions for receiving market data from exchange computer system 101 and displaying that information to a user.

Of course, numerous additional servers, computers, handheld devices, personal digital assistants, telephones and other devices may also be connected to exchange computer system 101. Moreover, one skilled in the art will appreciate that the topology shown in FIG. 1 is merely an example and that the components shown in FIG. 1 may include other components not shown and be connected by numerous alternative topologies.

Figure 2:
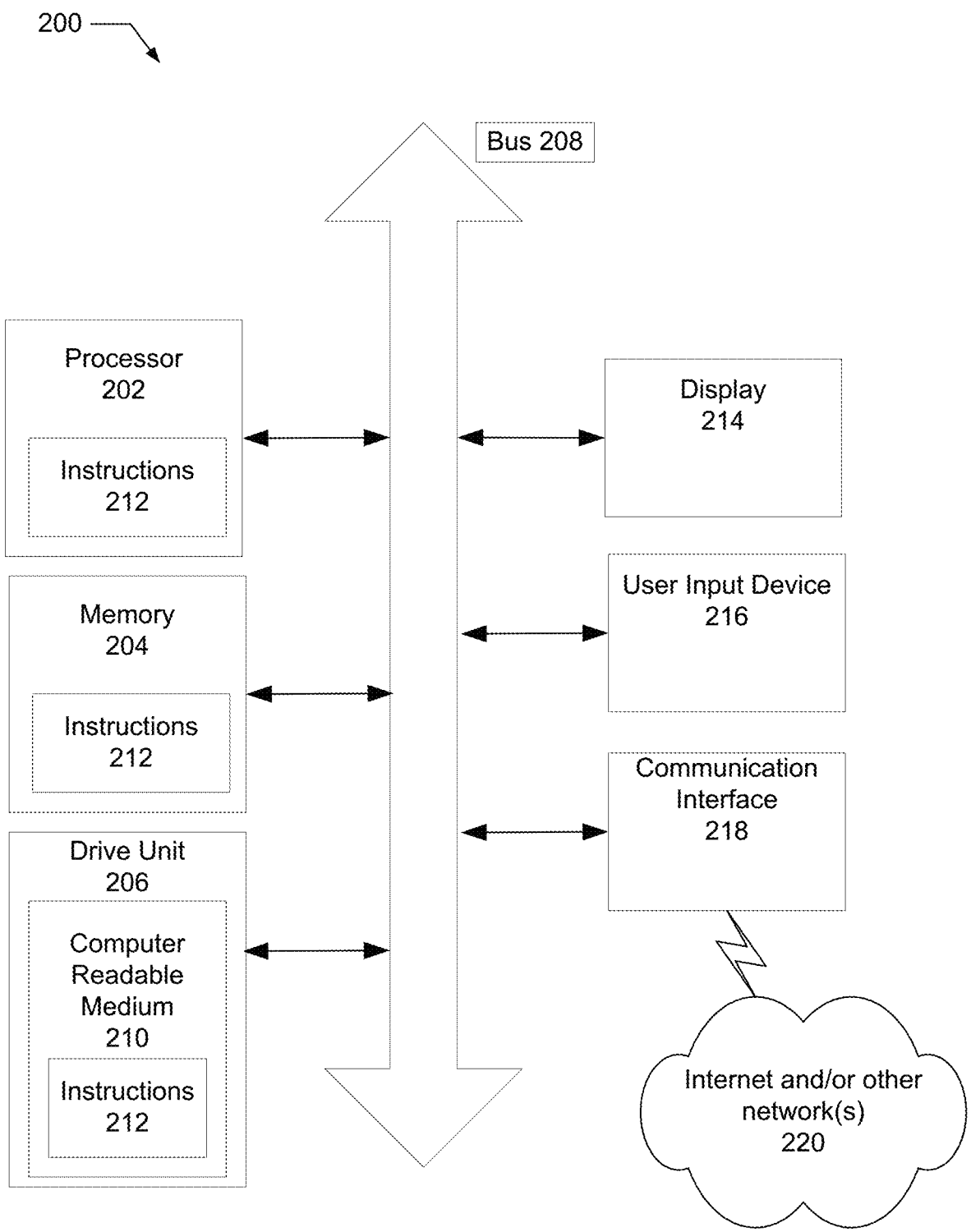
FIG. 2 shows an illustrative embodiment of a general computer system for use in or with the examples of FIGS. 1, 3 and 4.

Referring to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed above may be a computer system 200 or a component in the computer system 200. The computer system 200 may implement a match engine on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate with a drive unit 206 and other components of the system 200 via a bus 208. The memory 204 may be a main memory, a static memory, or a dynamic memory. The memory 204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 204 is operable to store instructions 210 executable by the processor 202. The functions, acts or tasks illustrated in the figures or described herein may be performed by the programmed processor 202 executing the instructions 210 stored in the memory 204. The instructions 210 may be loaded or accessed from a computer-readable storage medium 212 in the drive unit 206 or other data storage device. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 212, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include an optical or other disk drive unit as the drive unit 206. The disk drive unit 206 may include the computer-readable storage medium 212 in which one or more sets of instructions 210, e.g. software, can be embedded. Further, the instructions 210 may embody one or more of the methods or logic as described herein. In a particular embodiment, the instructions 210 may reside completely, or at least partially, within the memory 204 and/or within the processor 202 during execution by the computer system 200. The memory 204 and the processor 202 also may include computer-readable storage media as discussed above.

The present disclosure contemplates a computer-readable medium that includes instructions 210 or receives and executes instructions 210 responsive to a propagated signal, which may be received via a communication interface 218. The system 200 may be connected to a network 220 to communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to TCP/IP based networking protocols.

Figure 3:
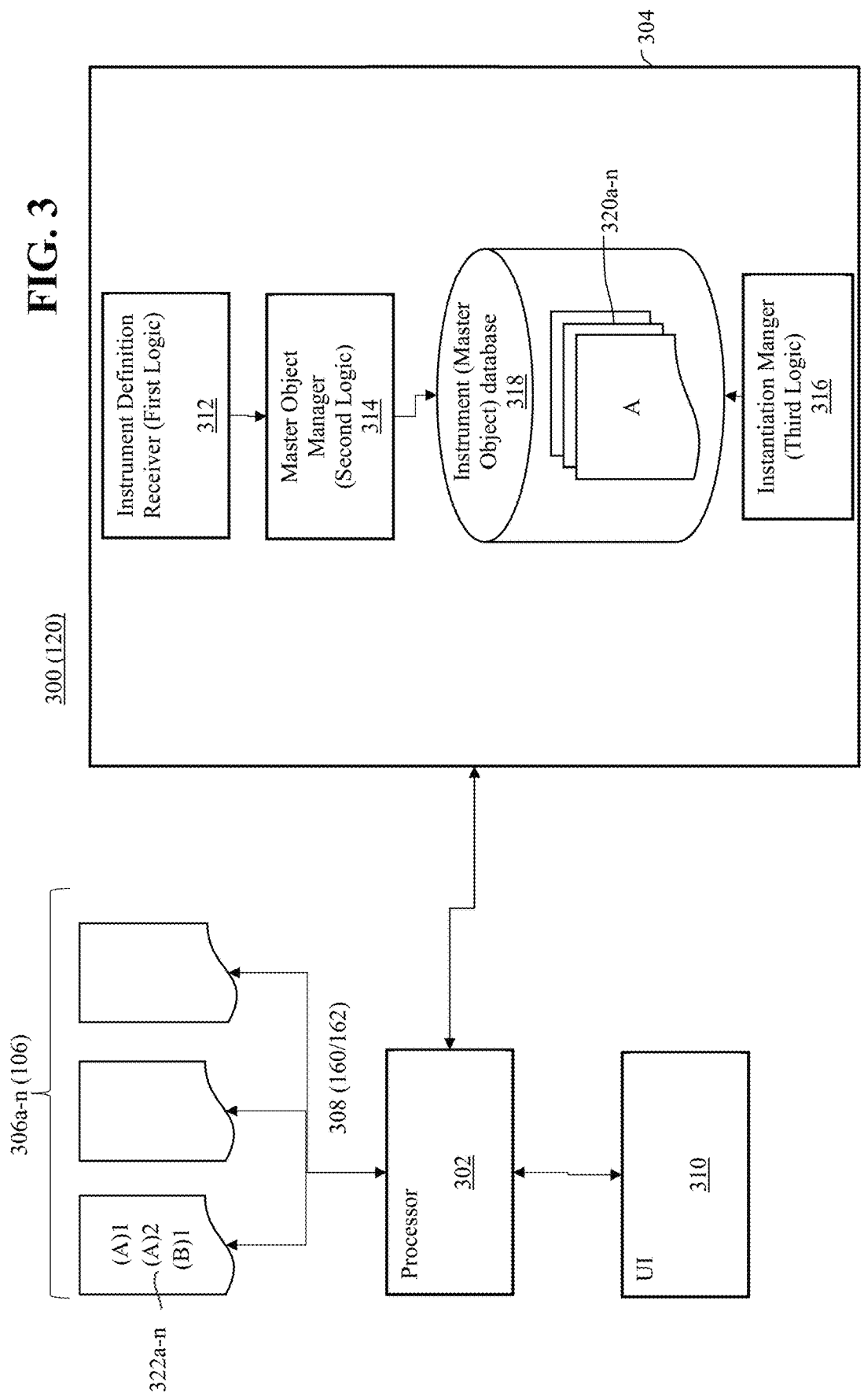
FIG. 3 is a block diagram of a system for reduction of computational resources of an electronic trading system required for management of electronic tradeable instruments implemented as instantiated data objects.

FIG. 3 depicts a block diagram a system/apparatus 300 for managing computational resources of an electronic trading system which may comprise one or more execution venues 306a-n, such as the execution venue 100 described above, or the matching engines 106 thereof, and more particularly for the reduction of computational resources of an electronic trading system required for management of electronic tradeable instruments via instantiation of data objects in a memory including both data inherited from and data linked to a master data object stored in an external data structure or database. The combination of both inherited and referenced attributes may uniquely define each instance to enable the electronic trading system to manage and process transactions for a large number of tradeable instrument variations with minimal computational resources. Thereby, the disclosed embodiments enable the listing en mass and scheduling of a large number of financial instruments for trading to cover, for example, various currency patterns, pricing sources and fixing times.

It will be appreciated that the system/apparatus 300 may be implemented by/at one of the plurality of execution venues 100 or separate therefrom. For example, the system 300 may be implemented as a module or component thereof of the exchange computer system 101 of one of the execution venues/transaction processors 306a-n (100), such as the instrument management module 120. The system 300 includes a processor 302, and a non-transitory memory 304 coupled therewith, such as the processor 202, memory 204, described in detail above with reference to FIG. 2.

The system 300 may include, i.e., the processor 302, which may be referred to as an instrument management processor 302, may implement a master object manager 314 operative, or otherwise configured, to store, in a database 318, which may be referred to as an instrument reference or product master database 318, coupled with the processor 302 and external to the matching engine(s) 106, a plurality of master data objects 320a-n, which may be referred to as product masters or instrument templates, each including first data indicative of values of a first plurality of parameters, such as fixing source, locale, currency pair, trader permissions or other "market control attributes, which uniquely characterize the master data object 320a-n among the plurality of master data objects 320a-n. Data indicative of, or otherwise defining, one or more master data objects 320a-n to be stored in the database 318 may be received, e.g., from a user, via the instrument definition receiver 312 which may include a user interface 310, which may include or use the display 214 and user input device 216 described above with respect to FIG. 2, presented by the processor 302 on a display coupled therewith, such as via a web-based interface. The instrument definition receiver 312 may be used to both receive data indicative of new master data objects 320a-n (product masters) or modifications to existing master data objects 320a-n.

The processor 302 may be coupled with the matching engine(s) 106 via a network 308, which may be the network 160/162 described above. Where the system 300 is integrated as a module, e.g., the module 120, of at least one exchange computing system 101, it may communicate with the matching engine(s) 106 thereof via an internal communication medium, such as a network or inter-process communications, while communicating with remote match engine(s) 106 via the network 308/162.

The system may further include, i.e., the processor 302 may further implement an instantiation manager 316 coupled with the database 318 and operative, or otherwise configured, to instantiate, within a memory (not shown) of the matching engine(s) 106, based on each of the plurality of master data objects 320a-n, at least one instance 322a-n of the master data object 320a-n, each comprising a data size that is less, e.g., due to the inclusion of a link to the parameters of the master data object 320a-n rather than a copy of those parameters, than a data size of the master data object 320a-n from which it was instantiated and enabling the matching engine(s) 106 to process, e.g., in accordance with the permission data specified by the master data object 320a-n and scheduling data specified by the instance 322a-n, received transactions, e.g., fixing transactions, related to the master data object 320a-n without having the master data 320a-n object stored in the memory of matching engine(s) 106, wherein each of the at least one instance 322a-n of each master data object 320a-n includes: an electronic link (not shown) to the first data of the master data object 320a-n, from which the instance 322a-n was instantiated, indicative of the values of the first plurality of parameters; and second data indicative of values of a second plurality of parameters, e.g., fixing time or other scheduling related data, which, together with the values of the first plurality of parameters of the master data object 320a-n from which the instance 322a-n was instantiated, uniquely characterize the instance 322a-n among the instantiated instances, wherein a modification of the data of any of any of the first plurality of parameters of a particular master data object 320a-n is automatically propagated via the electronic link to each instance 322a-n thereof to cause the characterization of all instances 322a-n of that master data object 320an-n to be modified in accordance therewith. By eliminating redundant replication of the parameters of the master data objects 320a-n across all instances 322a-n thereof, the overall data size of the instances 322a-n as stored in the matching engine(s)' 106 memory is reduced.

One or more of the user interface 310, instrument definition receiver 312, master object manager 314, or instantiation manager 316 may be computer executable program code stored in the memory 304, implemented as a separate component or as one or more logic components, such as on an FPGA which may include a memory or reconfigurable component to store logic and a processing component to execute the stored logic, or as first and second logic respectively, e.g. computer program logic, stored in a memory, such as the memory 204 shown in FIG. 2 and described in more detail above with respect thereto, or other non-transitory computer readable medium, and executable by a processor 302, such as the processor 204 shown in FIG. 2 and described in more detail above with respect thereto, to cause the processor 302 to, or otherwise be operative as described.

In one embodiment, each instance 322a-n may be associated with an order book database or data structure (not shown) maintained by the match engine(s) 106 which stores data indicative of previously received not yet canceled and not yet satisfied transactions for an instrument defined by the instance 322a-n and used to match subsequently received transactions to complete trades therefore. In one embodiment, matched transactions may also be stored until such time as a price, e.g., a fixing price, is established and the trades can then be completed/settled.

In one embodiment, the received transactions are received from any of a plurality of market participants (not shown), the first plurality of parameters of each master data object 320a-n comprising permissions defining subsets of the plurality of market participants who are permitted to submit a transaction related to that master data object 320a-n, the matching engine(s) 106, upon receipt of a transaction from a market participant, configured to access the first plurality of parameters of the master object 320a-n related thereto via the electronic link of the instance 322a-n thereof stored in the memory of the matching engine(s) 106 to determine if the market participant from which the transaction was received is permitted to submit a transaction related to the master data object 320a-n, the matching engine(s) 106 configured to reject the transaction if the market participant from which it was received is determined to not be permitted to submit transactions related to the master data object 320a-n. The permissions may be defined as permissive, specifying who can trade, or exclusive, specifying who cannot trade.

In one embodiment, each instance 322a-n defines a financial instrument for which transactions may be received by the electronic trading system and processed by the matching engine(s) 106, and wherein the second plurality of parameters defines a recurring time schedule of when the financial instrument may be transacted. For example, each tradeable financial instrument may comprise an FX spot instrument for a particular currency pair to be priced at a particular fixing time based on data provided by a particular fixing price source, i.e., one of the second plurality of parameters comprises a fixing time, each instance of particular master data object being characterized by a different fixing (scheduled closing) time. Wherein the matching engine(s) 106 processes trade orders for the financial instrument represented by the instance 322a-n only until occurrence of the fixing time (in an order book data structure just for that instrument) and cycles, subsequent to listing (initial opening), between opening, closing and reopening at a new closing time (scheduled), where the scheduled recurring time may be every 30 minutes, 1 hour, 12 hours, 1 day, etc.

In one embodiment, the electronic link comprises a memory address pointer, e.g., pointing to a memory address or database location where the master data object 320a-n, or the parameters thereof, are stored. In one embodiment, the electronic link of an instance 322a-n comprises a data size less than a data size of the first data indicative of the first plurality of parameters of the master data object 320a-n from which the instance 322a-n is instantiated.

In one embodiment, the plurality of master data objects 320a-n are stored in the database 318 in a first arrangement in accordance with one or more of the first plurality of parameters, e.g., arranged by fixing source, and further wherein the instances 322a-n are stored in the memory of the match engine(s) 106 in a second arrangement, different from the first arrangement, in accordance with one or more of the second plurality of parameters, e.g., arranged by schedule/fixing time. It will be appreciated that the master data objects 320a-n and instances 322a-n may be independently logically and/or physically arranged and/or grouped in any manner while preserving the inherited by reference linkage therebetween.

Figure 4:
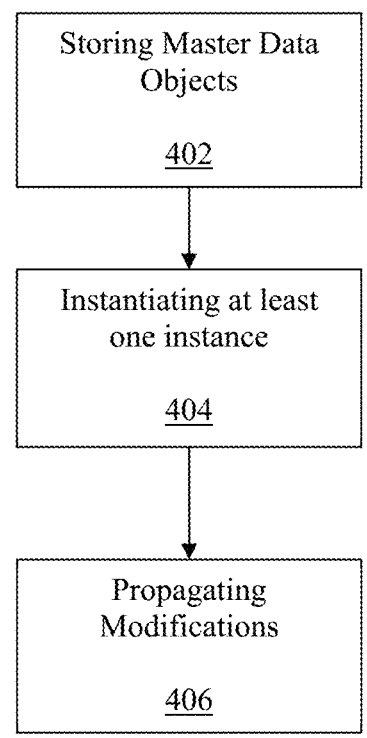
FIG. 4 is a flow diagram depicting operation of the system of FIG. 3.

FIG. 4 depicts a flow chart showing operation of the system 300 of FIG. 3. In particular FIG. 4 shows a method, which may be computer implemented, for managing computational resources of an electronic trading system, and more particularly for the reduction of computational resources of an electronic trading system required for management of electronic tradeable instruments via instantiation of data objects in a memory including both data inherited from and data linked to a master data object stored in an external data structure or database.

The operation of the system 300 may include: storing, by a processor 302 in a database 318 coupled therewith and external to a matching engine(s) 106, a plurality of master data objects 320a-n, each including first data indicative of values of a first plurality of parameters which uniquely characterize the master data object 320a-n among the plurality of master data objects 320a-n (Block 402); instantiating, by the processor 302 within a memory of the matching engine(s) 106, based on each of the plurality of master data objects 320a-n, at least one instance 322a-n of the master data object 320a-n, each comprising a data size that is less than a data size of the master data object 320a-n from which it was instantiated and enabling the matching engine(s) 106 to process received transactions related to the master data object 320a-n without having the master data object 320a-an stored in the memory of matching engine(s) 106 (Block 404), wherein each of the at least one instance 322a-n of each master data object 320a-n includes: an electronic link to the first data of the master data object 320a-n, from which the instance 322a-n was instantiated, indicative of the values of the first plurality of parameters; and second data indicative of values of a second plurality of parameters which, together with the values of the first plurality of parameters of the master data object 320a-n from which the instance 322a-n was instantiated, uniquely characterize the instance 322a-n among the instantiated instances 322a-n; and wherein a modification of the data of any of the first plurality of parameters of a particular master data object 320a-n is automatically propagated via the electronic link to each instance 322a-n thereof to cause the characterization of all instances 322a-n of that master data object 320a-n to be modified in accordance therewith (Block 406).

In one embodiment, the received transactions are received from any of a plurality of market participants, the first plurality of parameters of each master data object 320a-n comprising permissions defining subsets of the plurality of market participants who are permitted to submit a transaction related to that master data object 320a-n, the matching engine(s) 106, upon receipt of a transaction from a market participant, accessing the first plurality of parameters of the master object 320a-n related thereto via the electronic link of the instance 322a-n thereof stored in the memory of the matching engine(s) 106 to determine if the market participant from which the transaction was received is permitted to submit a transaction related to the master data object 320a-n, the matching engine(s) 106 rejecting the transaction if the market participant from which it was received is determined to not be permitted to submit transactions related to the master data object 320a-n.

In one embodiment, each instance 322a-n is associated with an order book data structure configured to store data indicative of received but not satisfied transactions related to the master data object 320a-n from which the instance 322a-n was instantiated.

In one embodiment, each instance 322a-n defines a financial instrument for which transactions may be received by the electronic trading system and processed by the matching engine(s) 106, and wherein the second plurality of parameters defines a recurring time schedule of when the financial instrument may be transacted.

In one embodiment, the electronic link comprises a memory address pointer. In one embodiment, the electronic link of an instance 322a-n comprises a data size less than a data size of the first data indicative of the first plurality of parameters of the master data object 320a-n from which the instance 322a-n is instantiated.

In one embodiment, the plurality of master data objects 320a-n are stored in the database 318 in a first arrangement in accordance with one or more of the first plurality of parameters and further wherein the instances 322a-n are stored in the memory of the match engine(s) 106 in a second arrangement, different from the first arrangement, in accordance with one or more of the second plurality of parameters.

The order of the acts or steps of the operation may vary from the example shown.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the terms "computer-readable medium" and "computer-readable storage medium" include a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable storage medium may be or include a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an example, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The disclosed computer programs (also known as a program, software, software application, script, or code) can be written in any form of programming language, including compiled or interpreted languages. The disclosed computer programs can be deployed in any form, including as a standalone program or as a module, component, subroutine, or other unit suitable for use in a computing environment. Such computer programs do not necessarily correspond to a file in a file system. Such programs can be stored in a portion of a file that holds other programs or data (e.g., one or more scripts stored in a markup language document), in a single file dedicated to the program in question, or in multiple coordinated files (e.g., files that store one or more modules, sub programs, or portions of code). Such computer programs can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for managing computational resources of an electronic trading system, the method comprising:
   storing, by a processor in a database coupled therewith and external to a matching engine, a plurality of master data objects, each including first data indicative of values of a first plurality of parameters which uniquely characterize the master data object among the plurality of master data objects;
   instantiating, by the processor within a memory of the matching engine, based on each of the plurality of master data objects, at least one instance of the master data object, each comprising a data size that is less than a data size of the master data object from which it was instantiated and enabling the matching engine to process received transactions related to the master data object without having the master data object stored in the memory of matching engine, wherein each of the at least one instance of each master data object includes:
      an electronic link to the first data of the master data object, from which the instance was instantiated, indicative of the values of the first plurality of parameters; and
      second data indicative of values of a second plurality of parameters which, together with the values of the first plurality of parameters of the master data object from which the instance was instantiated, uniquely characterize the instance among the instantiated instances; and
   wherein a modification of the data of any of any of the first plurality of parameters of a particular master data object is automatically propagated via the electronic link to each instance thereof to cause the characterization of all instances of that master data object to be modified in accordance therewith.

2. The computer implemented method of claim 1, wherein the received transactions are received from any of a plurality of market participants, the first plurality of parameters of each master data object comprising permissions defining subsets of the plurality of market participants who are permitted to submit a transaction related to that master data object, the matching engine, upon receipt of a transaction from a market participant, accessing the first plurality of parameters of the master object related thereto via the electronic link of the instance thereof stored in the memory of the matching engine to determine if the market participant from which the transaction was received is permitted to submit a transaction related to the master data object, the matching engine rejecting the transaction if the market participant from which it was received is determined to not be permitted to submit transactions related to the master data object.

3. The computer implemented method of claim 1, wherein each instance is associated with an order book data structure configured to store data indicative of received but not satisfied transactions related to the master data object from which the instance was instantiated.

4. The computer implemented method of claim 1, wherein each instance defines a financial instrument for which transactions may be received by the electronic trading system and processed by the matching engine, and wherein the second plurality of parameters defines a recurring time schedule of when the financial instrument may be transacted.

5. The computer implemented method of claim 1, wherein the electronic link comprises a memory address pointer.

6. The computer implemented method of claim 1, wherein the electronic link of an instance comprises a data size less than a data size of the first data indicative of the first plurality of parameters of the master data object from which the instance is instantiated.

7. The computer implemented method of claim 1, wherein the plurality of master data objects are stored in the database in a first arrangement in accordance with one or more of the first plurality of parameters and further wherein the instances are stored in the memory of the match engine in a second arrangement, different from the first arrangement, in accordance with one or more of the second plurality of parameters.

8. A system for managing computational resources of an electronic trading system, the system comprising:
first logic stored in a memory and executable by a processor to cause the processor to store, in a database coupled therewith and external to a matching engine, a plurality of master data objects, each including first data indicative of values of a first plurality of parameters which uniquely characterize the master data object among the plurality of master data objects;
second logic stored in the memory and coupled with the first logic and executable by the processor to cause the processor to instantiate, within a memory of the matching engine, based on each of the plurality of master data objects, at least one instance of the master data object, each comprising a data size that is less than a data size of the master data object from which it was instantiated and enabling the matching engine to process received transactions related to the master data object without having the master data object stored in the memory of matching engine, wherein each of the at least one instance of each master data object includes:
an electronic link to the first data of the master data object, from which the instance was instantiated, indicative of the values of the first plurality of parameters; and
second data indicative of values of a second plurality of parameters which, together with the values of the first plurality of parameters of the master data object from which the instance was instantiated, uniquely characterize the instance among the instantiated instances; and
wherein a modification of the data of any of any of the first plurality of parameters of a particular master data object is automatically propagated via the electronic link to each instance thereof to cause the characterization of all instances of that master data object to be modified in accordance therewith.

9. The system of claim 8, wherein the received transactions are received from any of a plurality of market participants, the first plurality of parameters of each master data object comprising permissions defining subsets of the plurality of market participants who are permitted to submit a transaction related to that master data object, the matching engine, upon receipt of a transaction from a market participant, configured to access the first plurality of parameters of the master object related thereto via the electronic link of the instance thereof stored in the memory of the matching engine to determine if the market participant from which the transaction was received is permitted to submit a transaction related to the master data object, the matching engine configured to reject the transaction if the market participant from which it was received is determined to not be permitted to submit transactions related to the master data object.

10. The system of claim 8, wherein each instance is associated with an order book data structure configured to store data indicative of received but not satisfied transactions related to the master data object from which the instance was instantiated.

11. The system of claim 8, wherein each instance defines a financial instrument for which transactions may be received by the electronic trading system and processed by the matching engine, and wherein the second plurality of parameters defines a recurring time schedule of when the financial instrument may be transacted.

12. The system of claim 8, wherein the electronic link comprises a memory address pointer.

13. The system of claim 8, wherein the electronic link of an instance comprises a data size less than a data size of the first data indicative of the first plurality of parameters of the master data object from which the instance is instantiated.

14. The system of claim 8, wherein the plurality of master data objects are stored in the database in a first arrangement in accordance with one or more of the first plurality of parameters and further wherein the instances are stored in the memory of the match engine in a second arrangement, different from the first arrangement, in accordance with one or more of the second plurality of parameters.

15. A system for managing computational resources of an electronic trading system, the system comprising:
a processor and a memory coupled therewith which stores computer executable instructions that, when executed by the processor, cause the processor to:
store, in a database coupled with the processor and external to a matching engine, a plurality of master data objects, each including first data indicative of values of a first plurality of parameters which uniquely characterize the master data object among the plurality of master data objects;
instantiate, within a memory of the matching engine, based on each of the plurality of master data objects, at least one instance of the master data object, each comprising a data size that is less than a data size of the master data object from which it was instantiated and enabling the matching engine to process received transactions related to the master data object without having the master data object stored in the memory of matching engine, wherein each of the at least one instance of each master data object includes:
an electronic link to the first data of the master data object, from which the instance was instantiated, indicative of the values of the first plurality of parameters; and
second data indicative of values of a second plurality of parameters which, together with the values of the first plurality of parameters of the master data object from which the instance was instantiated, uniquely characterize the instance among the instantiated instances; and
wherein a modification of the data of any of any of the first plurality of parameters of a particular master data object is automatically propagated via the electronic link to each instance thereof to cause the characterization of all instances of that master data object to be modified in accordance therewith.

16. The system of claim 15, wherein the received transactions are received from any of a plurality of market participants, the first plurality of parameters of each master data object comprising permissions defining subsets of the plurality of market participants who are permitted to submit a transaction related to that master data object, the matching engine, upon receipt of a transaction from a market participant, configured to access the first plurality of parameters of the master object related thereto via the electronic link of the instance thereof stored in the memory of the matching engine to determine if the market participant from which the transaction was received is permitted to submit a transaction related to the master data object, the matching engine configured to reject the transaction if the market participant from which it was received is determined to not be permitted to submit transactions related to the master data object.

17. The system of claim 15, wherein each instance is associated with an order book data structure configured to store data indicative of received but not satisfied transactions related to the master data object from which the instance was instantiated.

18. The system of claim 15, wherein each instance defines a financial instrument for which transactions may be received by the electronic trading system and processed by the matching engine, and wherein the second plurality of parameters defines a recurring time schedule of when the financial instrument may be transacted.

19. The system of claim 15, wherein the electronic link comprises a memory address pointer.

20. The system of claim 15, wherein the electronic link of an instance comprises a data size less than a data size of the first data indicative of the first plurality of parameters of the master data object from which the instance is instantiated.

21. The system of claim 15, wherein the plurality of master data objects are stored in the database in a first arrangement in accordance with one or more of the first plurality of parameters and further wherein the instances are stored in the memory of the match engine in a second arrangement, different from the first arrangement, in accordance with one or more of the second plurality of parameters.

* * * * *